United States Patent Office 3,031,491
Patented Apr. 24, 1962

3,031,491
PURIFICATION OF ESTERS OF DICARBOXYLIC ACIDS
Kenneth Rowland Dobson, Hull, and Hubert Charles Bailey, Ealing, London, England, assignors to The Distillers Company Limited, Edinburgh, Scotland, a British company
No Drawing. Filed Dec. 3, 1957, Ser. No. 700,289
Claims priority, application Great Britain Dec. 27, 1956
5 Claims. (Cl. 260—475)

The present invention relates to a process for the purification of esters and more particularly to the purification of esters of dicarboxylic acids which are useful as plasticisers and synthetic lubricants.

It is an object of the present invention to provide a process of purifying esters of dicarboxylic acids.

Accordingly, the present invention is the process of purifying alkyl and oxa-alkyl diesters of dicarboxylic acids which comprises treating the ester with ozone and thereafter subjecting the treated ester to reducing conditions.

Esters which may be purified by the process of the present invention include the diesters of saturated aliphatic alcohols with dicarboxylic acids, such as phthalic acid, pimelic acid, sebacic acid, oxalic acid and tartaric acid; mixed esters of these acids, such as butyl octyl phthalate, may also be purified by the process. Particularly suitable saturated aliphatic alcohols are those having four or more carbon atoms per molecule, such as butanols, octanols, nonanols and decanols and alcohols containing ether linkages such as butoxy-ethanol. Specific examples of esters which may be purified are dibutoxyethyl phthalate and di-2-ethylhexyl phthalate and the diester of a phthalic acid with a mixture of primary alcohols containing from seven to nine carbon atoms per molecule.

The ozone used in the process of the invention is preferably in the form of ozonised air. Decolorisation takes place more rapidly at elevated temperatures. It is preferred to carry out the ozone treatment at a temperature in the range from about 10° to 100° C.

The ester, after treatment with ozone, is subjected to reducing conditions. This may conveniently be effected by washing the ester with an aqueous solution of a reducing agent; the ester may also be conveniently subjected to reducing conditions by contacting it in the presence of hydrogen with a hydrogenation catalyst such as Raney nickel. The washing procedure may conveniently be carried out at a temperature of about 20° C. or at a higher temperature up to about 100° C. The ratio of the volume of ester to the volume of aqueous solution of the reducing agent used in the washing procedure may suitably be arranged to lie within the range from 20:1 to 5:1. The concentration of the reducing agent used, while not being critical, is preferably within the range from 1% to 20% by weight. Reducing agents which may be used include alkali metal sulphites and bisulphites, sulphor dioxide, sodium nitrite and hydrazine. The washing procedure is preferably carried out with an aqueous solution of the sulphite or bisulphite of an alkali metal, and, of these compounds, it is particularly preferred to use sodium sulphite or sodium bisulphite.

After treating with ozone and before subjecting it to reducing conditions, the ester may be washed with an aqueous solution of an alkali, suitable alkalis being the hydroxides of alkali metals such as sodium and potassium. The concentration of alkali used, while not critical, is preferably within the range of 1% to 20% by weight. The washing with alkali is preferably carried out at a temperature from about 20° to about 100° C. The ratio of the volume of ester to the volume of aqueous alkali used in the process, while again not being critical, is preferably within the range from 20:1 to 5:1.

After being subjected to reducing conditions, the ester may advanatgeously be washed with water. This washing is preferably carried out at a temperature from about 10° to about 100° C. The ratio of the volume of ester to the volume of water used in this washing is preferably within the range from 6:1 to 2:1.

After washing with water the ester may be dried by any suitable method, such as chemical drying or heating in vacuo followed by filtration.

The treatment of the esters with ozone by the process of the invention may be combined with other purification procedures either before or after the ozone treatment. The ester may, for instance, be washed with aqueous alkali solution before being treated with ozone and after the ozone treatment may be passed through a tower containing activated carbon. The product so purified may, if desired, be further treated with ozone again to reduce still further the colour of the ester. The ester may also be treated with steam after being washed with alkali in order to remove any traces of free alcohols present; this process may be carried out without impairing the improvement in the colour of the ester brought about by previous treatment with ozone and alkali.

The purification achieved by using the process of the invention may take the form of decolorising the esters or, if the esters have a comparatively high boiling point, the form of an improvement in the odour stability brought about by lowering the peroxide content of the esters; the two types of purification may be effected simultaneously. The purity of the esters, after treatment by the process of the invention, may be determined by any suitable method. The colour of the esters may, for example be measured in a Lovibond tintometer. The peroxide content of the esters may, for example, be measured by iodometric titration or by using ferrous thiocyanate.

The following examples are given to illustrate the process of the present invention. Parts by weight shown therein bear the same relation to parts by volume as do kilograms to litres. The colours of the esters were determined in a Lovibond tintometer using a 6 inch cell, except where otherwise stated. The peroxide contents of the esters, except where otherwise stated, were measured by the ferrous thiocyanate method described in "Industrial and Engineering Chemistry, Analytical Edition" (1947) volume 19 at page 980.

*Example 1*

A sample of the mixture of diesters obtained from phthalic anhydride and a mixture of primary alcohols containing from seven to nine carbon atoms per molecule was fed into a reactor at the rate of 120 parts by volume per hour, together with a stream of ozonised air fed in at the rate of 7,200 parts by volume per hour. The colour of the ester before treatment with ozone was 12.1 yellow 3.0 red (using a 1 inch cell). The reactor temperature was maintained at 25° C. and the residence time in the reactor was 2 hours.

100 parts by volume of the treated diester sample, which had a colour of 1.5 yellow 0.7 red, were then washed with 20 parts by volume of a 5% aqueous solution of sodium sulphite for 15 minutes at a temperature of 70° C. The mixture was allowed to settle and as much of the aqueous phase was removed as was possible without appreciable loss of the ester phase. The ester phase was then washed by agitation with water for 30 minutes at a temperature of 98° C., the ratio of ester to water being 4:1 by volume.

After allowing the mixture to settle, the aqueous phase was removed and the procedure of washing with water was repeated. The ester layer was then removed, dried and filtered.

The colour of the ester thus treated was found to be 0.5 yellow.

*Example 2*

A sample of di-2-ethylhexyl phthalate was treated with ozone as described in Example 1, the feed rate of the ester being 120 parts by volume per hour and that of the ozonised air being 7,200 parts by volume per hour. The reactor was maintained at a temperature of 25° C. and the residence time in the reactor was one hour.

One portion of the ozone treated ester sample was then washed with a 10% aqueous solution of sodium hydroxide at 70° C. for 15 minutes, the ratio of ester to alkali being 10:1 by volume. The mixture was then allowed to settle for 30 minutes during which time some separation of the ester and aqueous phases occurred. After removing as much of the aqueous phase as possible without appreciable loss of the ester phase, the remainder of the mixture was washed by agitation with water at 98° C. for 30 minutes, the ratio of ester to water being 4:1 by volume, and then allowed to settle for 30 minutes. The aqueous phase was then removed and the procedure of washing with water was repeated. The ester layer was then removed, dried and filtered.

A second portion of the ozone-treated ester sample was washed with a 5% aqueous solution of sodium sulphite using the method described in Example 1.

After either sample of ester had been treated with steam under reduced pressure, the peroxide contents were measured. It was found that the sample of ozone-treated ester washed with the sodium hydroxide solution contained $2.5 \times 10^{-3}\%$ peroxide expressed as percent weight per volume of active oxygen, whereas the sample washed with the sodium sulphite solution contained only $0.5 \times 10^{-3}\%$ peroxide expressed in the same manner.

*Example 3*

A sample of di-2-ethylhexyl phthalate was treated with ozone by the method described in Example 1, the feed rate of the ester being 120 parts by volume per hour and that of the ozonised air being 7,200 parts by volume per hour. The reactor temperature was maintained at 25° C. and the residence time in the reactor was one hour.

65 parts by volume of the ozone-treated ester were washed with 13 parts by volume of a 5% weight per volume of sodium bisulphite solution for 15 minutes at a temperature of 70° C. and was then washed with water. The ester phase was separated and subjected to washing with a 10% sodium hydroxide solution. In this way, the peroxide concentration of the ester was reduced to $0.8 \times 10^{-3}\%$ weight per volume as active oxygen.

A further sample of the ozone-treated ester was washed with 10% sodium hydroxide solution as described in Example 2. The peroxide concentration of this sample was $2.2 \times 10^{-3}\%$ weight per volume as active oxygen.

*Example 4*

A sample of di-2-ethylhexyl phthalate was treated with ozone by the method described in Example 1, the feed rate of the ester being 139 parts by volume per hour and that of the ozonised air being 24,000 parts by volume per hour. The reactor temperature was maintained at 20° C. and the residence time in the reactor was one hour.

The ozone-treated ester was then washed with 10% sodium hydroxide solution as described in Example 2. The peroxide concentration of the washed ester was $2.5 \times 10^{-3}\%$ weight per volume as active oxygen.

2,000 parts by volume of this ester were agitated in an atmosphere of hydrogen with 20 parts by weight of Raney nickel at 80° C. for 3 hours. The ester was then filtered and steam distilled at a pressure of 100 millimetres of mercury. The peroxide concentration of the ester was reduced to $0.3 \times 10^{-3}\%$ weight per volume as active oxygen.

*Example 5*

A sample of the diester obtained from phthalic anhydride and a mixture of alcohols containing from seven to nine carbon atoms in the molecule was treated with ozone by the method described in Example 1. The feed rate of the ester was 120 parts by volume per hour and that of the ozonised air was 7,200 parts by volume per hour. The reactor temperature was maintained at 25° C. and the residence time in the reactor was 2 hours. The peroxide content of the ester was 0.095% weight per volume as active oxygen, measured by iodometric titration.

One portion of the ozone-treated ester was washed with a 10% aqueous solution of sodium hydroxide as described in Example 2. A second portion of the ester was washed with 10 parts by volume of a 10 weight per volume aqueous solution of hydrazine for 30 minutes at 18–20° C. Both portions of ester were separately treated with steam at a pressure of 100 millimetres of mercury and the peroxide contents were measured. The peroxide content of the ester treated with aqueous sodium hydroxide was $4.1 \times 10^{-3}\%$ weight per volume as active oxygen, while that of the ester treated with the hydrazine was $0.2 \times 10^{-3}\%$ weight per volume as active oxygen.

We claim:

1. A process for purifying a diester of an acid selected from the group consisting of phthalic acid, pimelic acid, sebacic acid, oxalic acid and tartaric acid, with a saturated primary lower aliphatic alcohol of at least 4 carbon atoms which comprises contacting the ester with ozone at a temperature in the range from 10° C. to 100° C., and thereafter contacting the ester with a reducing agent at a temperature in the range from 20° C. to 100° C.

2. A process of purifying a diester of an acid selected from the group consisting of phthalic acid, pimelic acid, sebacic acid, oxalic acid and tartaric acid with a saturated primary lower aliphatic alcohol of at least 4 carbon atoms which comprises contacting the ester with ozonized air at a temperature in the range from 10° C. to 100° C. and thereafter contacting the ester with a reducing agent at a temperature in the range from 20° C. to 100° C.

3. A process of purifying a diester of an acid selected from the group consisting of phthalic acid, pimelic acid, sebacic acid, oxalic acid and tartaric acid with a saturated primary lower aliphatic alcohol of at least 4 carbon atoms which comprises contacting the ester with ozone at a temperature in the range from 10° C. to 100° C. and thereafter contacting the ester at a temperature in the range from 20° C. to 100° C. with a reducing agent selected from the group consisting of hydrogen in the presence of Raney nickel, alkali metal sulphites, alkali metal bisulphites, sulphur dioxide, alkali metal nitrites and hydrazine.

4. A process of purifying a diester of an acid selected from the group consisting of phthalic acid, pimelic acid, sebacic acid, oxalic acid and tartaric acid with a saturated primary lower aliphatic alcohol of at least 4 carbon atoms which comprises contacting the ester with ozone at a temperature in the range from 10° C. to 100° C., thereafter washing the ester with an aqueous solution of an alkali metal hydroxide at a temperature in the range from 20° C. to 100° C., the ratio of the volume of ester to the volume of the alkali metal hydroxide solution being within the range from 20:1 to 5:1, and thereafter contacting the washed ester with a reducing agent at a temperature in the range from 20° C. to 100° C.

5. A process of purifying a diester of an acid selected from the group consisting of phthalic acid, pimelic acid, sebacic acid, oxalic acid and tartaric acid with a saturated primary lower aliphatic alcohol of at least 4 carbon atoms which comprises contacting the ester with ozone at a temperature in the range from 10° C. to 100° C., thereafter contacting the ester with a reducing agent at a temperature in the range from 20° C. to 100° C. and thereafter washing the ester with water at a temperature in the range from 10° C. to 100° C., the ratio of the volume of ester to the volume of water being within the range from 6:1 to 2:1.

References Cited in the file of this patent

UNITED STATES PATENTS

| | | |
|---|---|---|
| 1,339,126 | Nicholls | May 4, 1920 |
| 1,823,352 | Grespi et al. | Sept. 15, 1931 |
| 1,905,974 | Livingston | Apr. 25, 1933 |
| 2,466,633 | Brabender et al. | Apr. 5, 1949 |

OTHER REFERENCES

Gambarotta: Che. Abst., 31, 6786 (1937).

Groggins: "Unit Processes in Organic Synthesis," page 429, McGraw-Hill, 1952.